Jan. 7, 1930. E. E. UNDERWOOD 1,742,796
CONTROL FOR FILM ADVANCING MECHANISM

Filed May 4, 1925

Ernest E. Underwood,
INVENTOR,

BY
ATTORNEYS.

Patented Jan. 7, 1930

1,742,796

UNITED STATES PATENT OFFICE

ERNEST EDWIN UNDERWOOD, OF ROCHESTER, NEW YORK, ASSIGNOR TO EASTMAN KODAK COMPANY, OF ROCHESTER, NEW YORK, A CORPORATION OF NEW YORK

CONTROL FOR FILM-ADVANCING MECHANISM

Application filed May 4, 1925. Serial No. 28,006.

This invention relates to motion picture apparatus and more particularly to a device applicable to a pulldown of the claw type to keep the claws out of engagement with the film during threading.

A further object of the invention is to prevent the operation of the mechanism unless the claws are first restored to their operative position.

Other objects will appear from the following specification, reference being made to the accompanying drawing in the several figures of which the same characters indicate the same parts.

Figure 1:
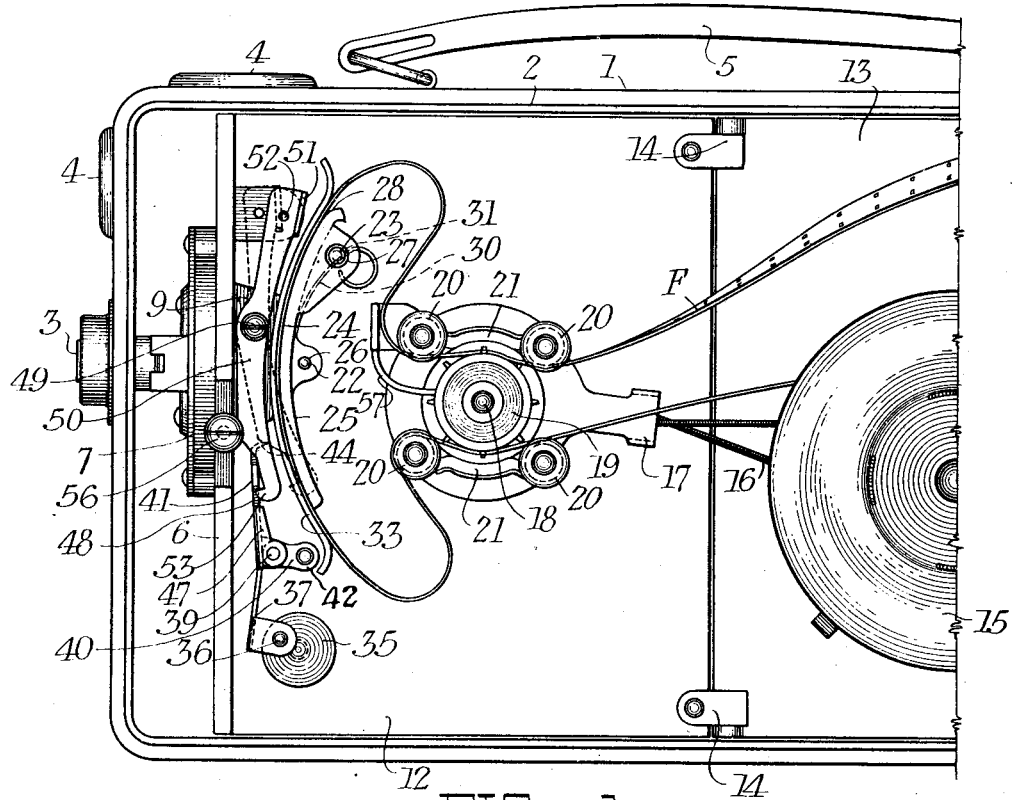
Fig. 1 is a side view of part of a motion picture camera with the side cover removed.
Figure 2:
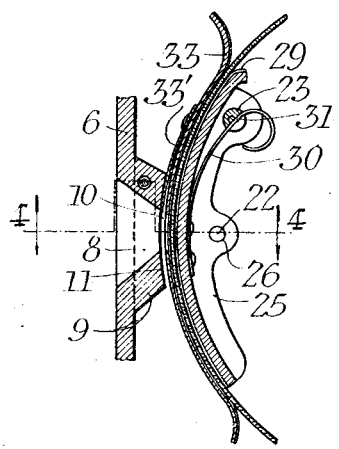
Fig. 2 is a section of the gate structure.

The invention is illustrated as applied to a camera of the type disclosed in the patent to Adolph Stuber and myself, No. 1,548,960, granted Aug. 11, 1925, and comprising a casing 1, one side of which is a removable cover. Fig. 1 shows the camera open and without this cover, which normally fits into the flanged edges 2 of the casing. The casing has the customary objective mount 3, finder lens mounts 4 and handle 5. A transverse partition 6 carries the mechanism, not shown in detail, including a casing 7 for the shutter. The partition is apertured at 8 and has a rearwardly extending boxing 9, converging to an exposure opening 10, the rear surface of the boxing being curved as shown at 11. A longitudinal partition 12 is situated in the front half of the camera and carries a rear partition 13, hinged thereto at 14. The rear partition carries the take up reel 15 as described in the said patent. This reel is driven by flexible belt 16 passing under guide 17 to a driving pulley (not shown) on shaft 18 journaled in partition 12 and carrying sprocket 19 against which the film F is held by rollers 20 and arcuate guides 21 fixed on partition 12.

Partition 12 carries two fixed lugs 22 and 23 upon which is seated a removable gate member 24. This gate member has a base plate 25 with apertures 26 and 27 adapted to fit over lugs 22 and 23 respectively. The base plate 25 has a longitudinally curved film guiding flange 28 extending outwardly and having the usual guides 29 for engaging the margins of the film only. Attached to the rear of the flange is a leaf spring 30 adapted to engage a notch 31 in lug 23 and constituting a latch. Flange 28 carries a forwardly extending lug 32 adapted to engage a corresponding aperture in the complementary curved guide member 33 which carries on its front surface a leaf 33' spring bearing against the surface 11. This guide member 33 is thus resiliently pressed against the guide member 28, and is carried thereby. The two members are readily removed together by manipulating latch 30 and sliding part 25 from lugs 22 and 23. Member 33 has an exposure opening 34 registering with exposure opening 10.

Figure 5:
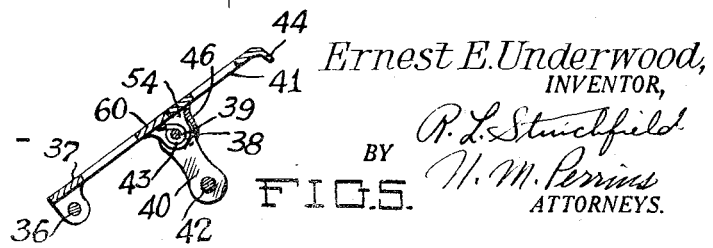
Fig. 5 is a section of a portion of the pulldown mechanism on line 5—5 of Fig. 3.

The pulldown mechanism comprises a rotatable disc 35 to which is eccentrically pivoted at 36 an elbow member 37 having at its other end ears 38 through which passes pintle 39 upon which is pivoted link members 40 and claw member 41. The link members 40 are pivoted on fixed lug 42 carried by partition 12. A spring 43 coiled around pintle 39 engages the members 37 and 41 to press member 41 toward the gate, its movement being limited by stops 54 on ears 38, the stops extending upwardly from the top 60 of member 37 in front of the bottom of member 41 as shown in Fig. 5. The claw member 41 has at its outer end claws 44 and at its inner end ears 45 and 46 by which it is pivoted. Ear 45 is extended to form a slight flange 47 beyond which there is a notch 48.

Pivoted by screw 49 on the side of the boxing 9 is a lever 50 having at its upper end a manipulating flange 51 and a dimple catch 52 by which it may be held in either of two positions shown in full and dotted lines respectively in Fig. 1. At the lower end of the lever is a claw 53 adapted to engage claw member 41 either in the notch 48 or in the guideway formed behind flange 47, depending on the position of the claw member 41.

Figures 3, 4:
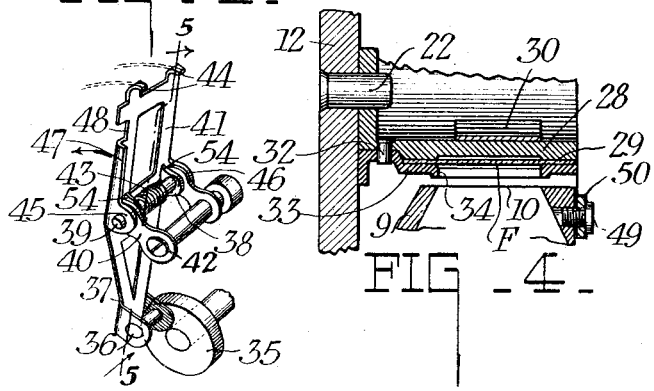
Fig. 3 is a perspective view of the claw mechanism.
Fig. 4 is a section on line 4—4 of Fig. 3.

When the lever is in the position shown in dotted lines it will be clear of the claw member which will then be free to travel in its prescribed path and engage and advance the film in the usual manner. When in this position the lever overlies the edges of the gate member and acts as an edge guide for the film, assisting in holding it in its proper path, this being shown in Fig. 4. When in the position shown in full line, it will engage the claw member 41 and swing it back against spring 43. Neither the claws nor the lever can then be in a position to interfere with the threading the film into the gate in loading the camera.

If the user forgets to replace the lever to its normal position he will be unable to operate the camera. If he attempts to do so by the usual motor or manual drive, after closing the camera, the claw 53, if not already in engagement with notch 48, will engage it before the claw member 41 shall have completed a single cycle, and will prevent its operation.

When the lever is released and claws 44 are moved toward the film F, they may not chance to enter perforations 55 in the film. In this case, they will merely slip along the film until they fall into the first set of perforations.

It is apparent that the two members 37 and 41 together constitute a resilient claw arm having a normal or standard shape from which it may be flexed and to which it will tend to return by resilient action.

The knob 56 shown in Fig. 1 is part of the latching mechanism to hold the cover in place on the camera, and 57 is a fixed guide for the film to prevent it from accidentally adhering to the sprocket, and guiding it to proper loop forming position.

It is to be understood that the structure herein disclosed is by way of example and that I contemplate as within the scope of my invention all such modifications and equivalents as fall within the appended claims.

Having thus described my invention, what I claim as new and desire to secure by Letters Patent is:

1. In motion picture apparatus, a structure forming a guideway for film, a hinged flexible claw arm having a claw at its end, mechanism to which said arm is pivoted for actuating said claw arm to cause the claw to travel in a path traversing said guideway to engage film and move it intermittently through said guideway, and means adapted to engage said claw arm and flex it away from said guide way, and to lock the claw against movement.

2. In motion picture apparatus, a structure forming a guide way, a resilient claw arm having a claw at its end, mechanism for actuating said claw arm to cause the claw to travel in a path traversing the film guide to engage film and move it intermittently through the film guide, said claw having a notch, and a lever having a claw and movable to cause the claw thereon to engage the arm and flex it away from the guideway, said second claw being adapted to be seated in said notch and lock the first named claw against movement.

3. In motion picture apparatus, a structure forming a guide way with an open edge, film engaging means having a path of movement in said guide way for engaging and advancing a film therein, and an element movable between two positions in one of which it is adapted to hold said film engaging means away from said guideway, and is itself out of registry with the open edge, and in the other of which it is situated across said open edge and leaves the claw free to move in its path.

4. In motion picture apparatus, a structure forming a guide way with an open edge, a claw, mechanism for actuating said claw to cause it to travel in a path traversing said guideway to engage film and move it intermittently through said guideway, and a lever movable between two positions, in one of which it is out of registry with said open edge and is adapted to hold the claw out of the guideway and in the other of which it is situated across said open edge and leaves the claw free to travel in said path.

5. In motion picture apparatus, a structure forming a guide way with an open edge, a resilient claw arm having a claw, mechanism for actuating said claw arm to cause the claw to travel in a path traversing the film guide, and a lever movable between two positions in one of which it is out of registry with the open edge and is adapted to engage the claw arm and lock it in an inoperative position with the claw out of the guideway, and in the other of which it is situated across the open edge and leaves the claw arm and claw free to be actuated.

Signed at Rochester, New York, this 29th day of April, 1925.

ERNEST EDWIN UNDERWOOD.